US012730583B2

(12) United States Patent
Mane et al.

(10) Patent No.: US 12,730,583 B2
(45) Date of Patent: Sep. 8, 2026

(54) SINGLE-CHIP COMPUTATIONAL EDGE STORAGE DEVICE

(71) Applicant: Seagate Technology LLC, Fremont, CA (US)

(72) Inventors: Hemantkumar Vitthalrao Mane, Pune (IN); Nahoosh Hemchandra Mandlik, Mumbai (IN); Nikhil Vasanthakumar, Pune (IN); Avinash Suresh Pisal, Pune (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/897,884

(22) Filed: Sep. 26, 2024

(65) Prior Publication Data

US 2026/0086732 A1 Mar. 26, 2026

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0689* (2013.01)

(58) Field of Classification Search
CPC ..... G06F 3/0655; G06F 3/0604; G06F 3/0689
See application file for complete search history.

(56) References Cited

U.S. PATENT DOCUMENTS 6,065,096 A * 5/2000 Day ..................... G06F 3/0658 711/112
10,466,937 B2 11/2019 Berger
10,521,295 B2 12/2019 Merl
2005/0135056 A1* 6/2005 Suzuki ................ G11B 33/126 361/679.33
2010/0214736 A1* 8/2010 Zhang .................. H01L 23/467 165/80.2
2015/0033305 A1 1/2015 Shear et al.
2018/0285192 A1 10/2018 Merl et al.
2019/0068707 A1* 2/2019 Todwal ................ G06F 3/0629
2022/0171694 A1 6/2022 Halderman et al.
2022/0197704 A1 6/2022 Gibb et al.
2022/0374310 A1 11/2022 Veprinsky et al.
2023/0350588 A1* 11/2023 Trantham ............. G06F 3/0689
2024/0220369 A1* 7/2024 Moshkovich ....... G06F 11/1469
2024/0362334 A1* 10/2024 Paulraj ..................... G06F 8/71

* cited by examiner

*Primary Examiner* — Craig S Goldschmidt
(74) *Attorney, Agent, or Firm* — Mueting Raasch Group

(57) ABSTRACT

A single chip data storage device includes an array of storage drives each comprising a drive controller, a non-volatile storage medium, and a volatile memory. A storage controller is coupled to the array, the storage controller providing host access to the array. One or more compute cores are configured to locally perform at least one operation on data stored on one or both of the non-volatile storage medium and the volatile memory based on a computational storage function received from the host.

20 Claims, 5 Drawing Sheets

SINGLE-CHIP COMPUTATIONAL EDGE STORAGE DEVICE

SUMMARY

A single chip data storage device includes an array of storage drives each comprising a drive controller, a non-volatile storage medium, and a volatile memory. A storage controller is coupled to the array, the storage controller providing host access to the array. One or more compute cores are configured to locally perform at least one operation on data stored on one or both of the non-volatile storage medium and the volatile memory based on a computational storage function received from the host.

A data storage system includes a housing and a single chip computational data storage device disposed in the housing. The single chip data storage device includes a storage controller and an array of storage drives. Each of the storage drives includes a drive controller, a NAND flash medium coupled to the drive controller, and a volatile memory coupled to the drive controller. One or both of the storage controller and the array of storage drives includes one or more compute cores configured to locally perform at least one operation on data stored on one or both of the array of storage drives and the volatile memory based on a computational storage function received from a host.

BRIEF DESCRIPTION OF THE DRAWINGS

The discussion below makes reference to the following figures, wherein the same reference number may be used to identify the similar/same component in multiple figures.

DETAILED DESCRIPTION

There has recently been a proliferation of Edge use cases like Smart-infrastructure, Smart-factories etc. Typically, these edge use cases deploy hundreds of sensors which generates huge volume of data. Often this data is used and discarded or typically stored within local silos for short duration for regulatory compliance. Since this data is stored in local silos, it is not available to extract the meaningful intelligence due to lack of compute resources available. Such storage techniques also inhibit data movement for further processing to next tear like datacenter where enough compute and storage resources are available to extract meaningful intelligence.

In order to extract meaningful intelligence from the data captured at the edge storage solution may provide a way to dynamically augment the storage capacity at the edge. The storage solution may have an interface that is low cost and allows for easy augmentation of storage capacity and allows for easy management.

Examples described herein uses the lowest possible power consumption because edge devices may be power constrained. In-storage compute capabilities allows for efficient management of data operations. Easy data movement capabilities may be provided that are conducted either over a network or by physically moving the data, or both. The data storage solution may have security features so as to protect data at rest as well as while it is being moved either over the network or physical movement. The storage solution may be rugged such that the data storage device can work efficiently in edge and data-center environments and in terrestrial and non-terrestrial environments.

Figure 1:
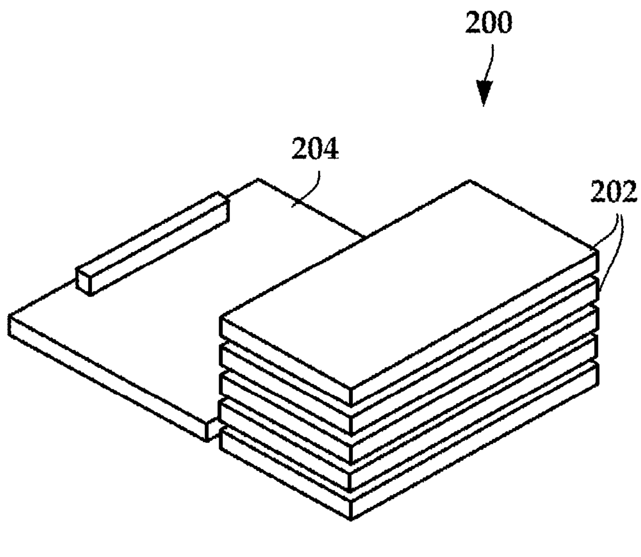
FIG. 1 is a diagram of a rugged storage according to an example embodiment.

In FIG. 1, a diagram illustrates an example of a data storage system 200 according to an example embodiment. The system includes an array of drives 202 each comprising controllers and non-volatile, solid-state storage media. The storage media may include NAND flash memory, resistive random access memory (RRAM), magnetoresistive random access memory (MRAM), phase change memory (PCM), ferroelectric RAM (FeRAM), magnetic disks, etc.

Generally, the drives 202 include circuitry that enables addressing the storage units of the media (e.g., pages, sectors) for purposes of reading and writing, and may include other circuits such as power conditioning, integrated error checking/recovery, garbage collection, wear leveling, etc. The drives 202 may include an industry standard common storage access interface, often referred to as a host interface. Examples of host interfaces include serial ATA (SATA), small computer system interface (SCSI), non-volatile memory express (NVMe), peripheral component interconnect express (PCIe), Compute Express Link (CXL) etc. The drives 202 may also include an industry standard physical form factor such as M.2, PCIe, 2.5 inch disk drive, etc., or may include off-the-shelf drive components integrated into one or more custom circuit boards (e.g., with more than one drive on each board). In one or more embodiments, the drives 202 may include hard disk drives (HDDs) with magnetic disks as a storage media instead of or in addition to a solid-state storage media (e.g., hybrid drive).

An array controller 204 is coupled to the array of drives 202. The controller 204 can be hardened by being manufactured with large process nodes, manufacturing on insulating and/or large bandgap substrates, use of bipolar devices, adding shielding, etc. The drive controller 204 provides failure-resistant data redundancy among the drives 202 of the array. The array controller 204 provides access to the array, e.g., to a host computer (not shown). In such a case, the array may be presented as one or more virtual volumes using an arrangement such as redundant array of independent disks (RAID). Note that in one or more embodiments, multiple array controllers 204 may be coupled to the array of drives 202. In such a case, the controllers 204 may operate in a high-availability arrangement, where each controller 204 acts as a primary controller for a first subset of the drives 202 and is coupled as a secondary controller for a second subset of the drives 202. If a primary controller fails, its function is taken over by the secondary controller, which then controls two subsets of the drives 202. Various aspects of a rugged storage device may be described in more detail in U.S. Pat. No. 11,989,428, which is incorporated by reference herein in its entirety.

According to various examples described herein one or more of the drives have computational storage capabilities to improve power efficiency and performance of the overall system. Using a computational storage device avoids extra data transfers, typically from SSDs through field programmable gate arrays (FPGAs) and/or controllers and PCIe interfaces to host main memory for processing. In examples described herein, the host can deploy computational-storage-function (CSF) statically or dynamically on to, for example, compute-cores available within the computational storage drive. At least some host operations can be performed near the stored data. The host instructs the computational storage device on operations to perform on the data and some or all of the processing is done locally within the computational storage drive.

One aspect of capturing data at the edge and then moving that physically to a datacenter is loss of data context and due to this, either data will remain unused involve additional effort to regenerate data context. The computational storage features described herein allows data to be preprocessed while in rest and a context can be generated. This context can be used by applications within datacenters to create faster and meaningful insights at lower power than in systems without the computational storage capabilities. According to various examples, if power is available while data is being moved physically, this computational storage feature can help in saving time for pre or post processing which otherwise happens in datacenter.

Figure 2A:
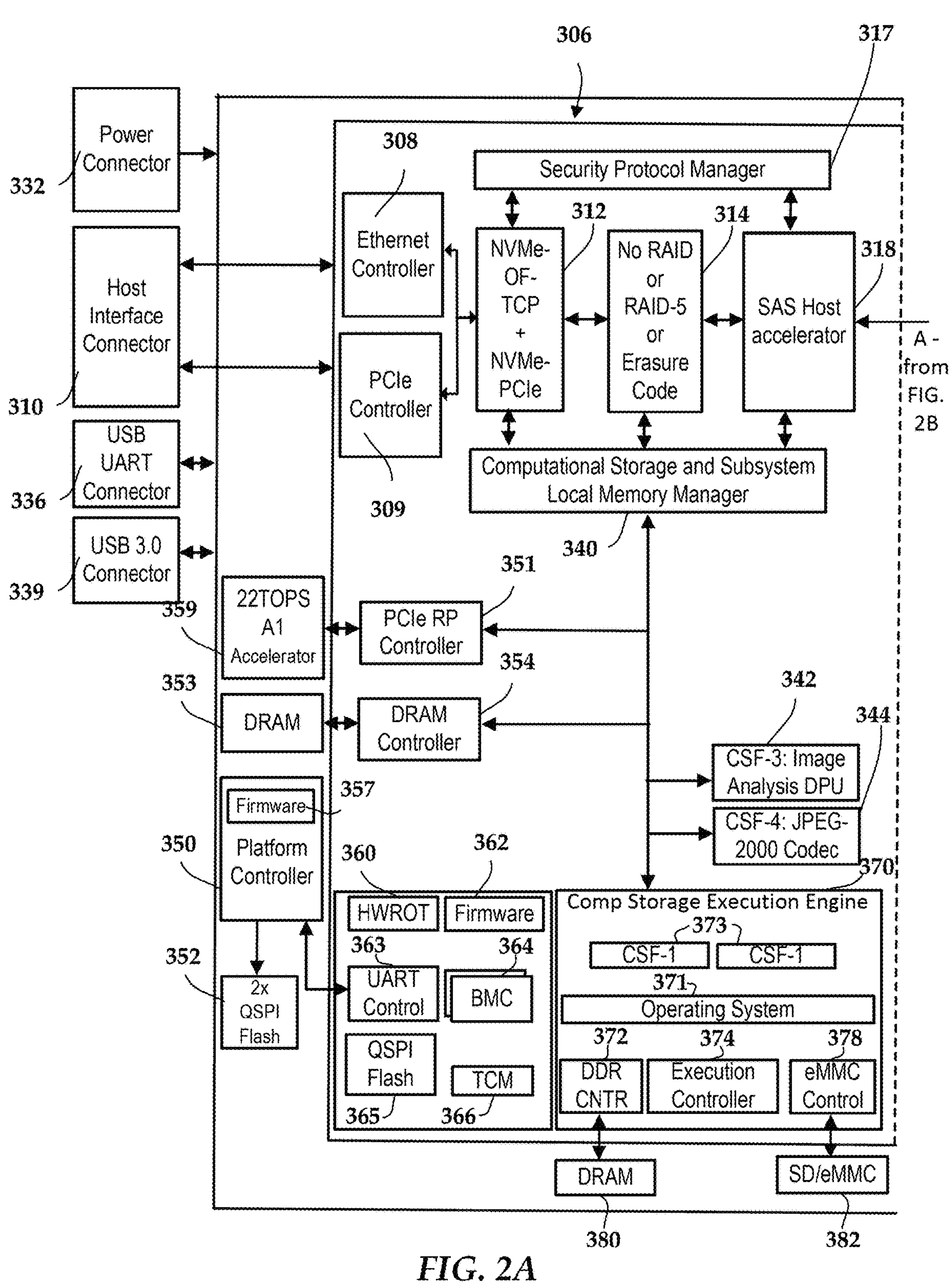
FIG. 2A and FIG. 2B show a schematic diagram of a rugged storage according to example embodiments.
Figure 2B:
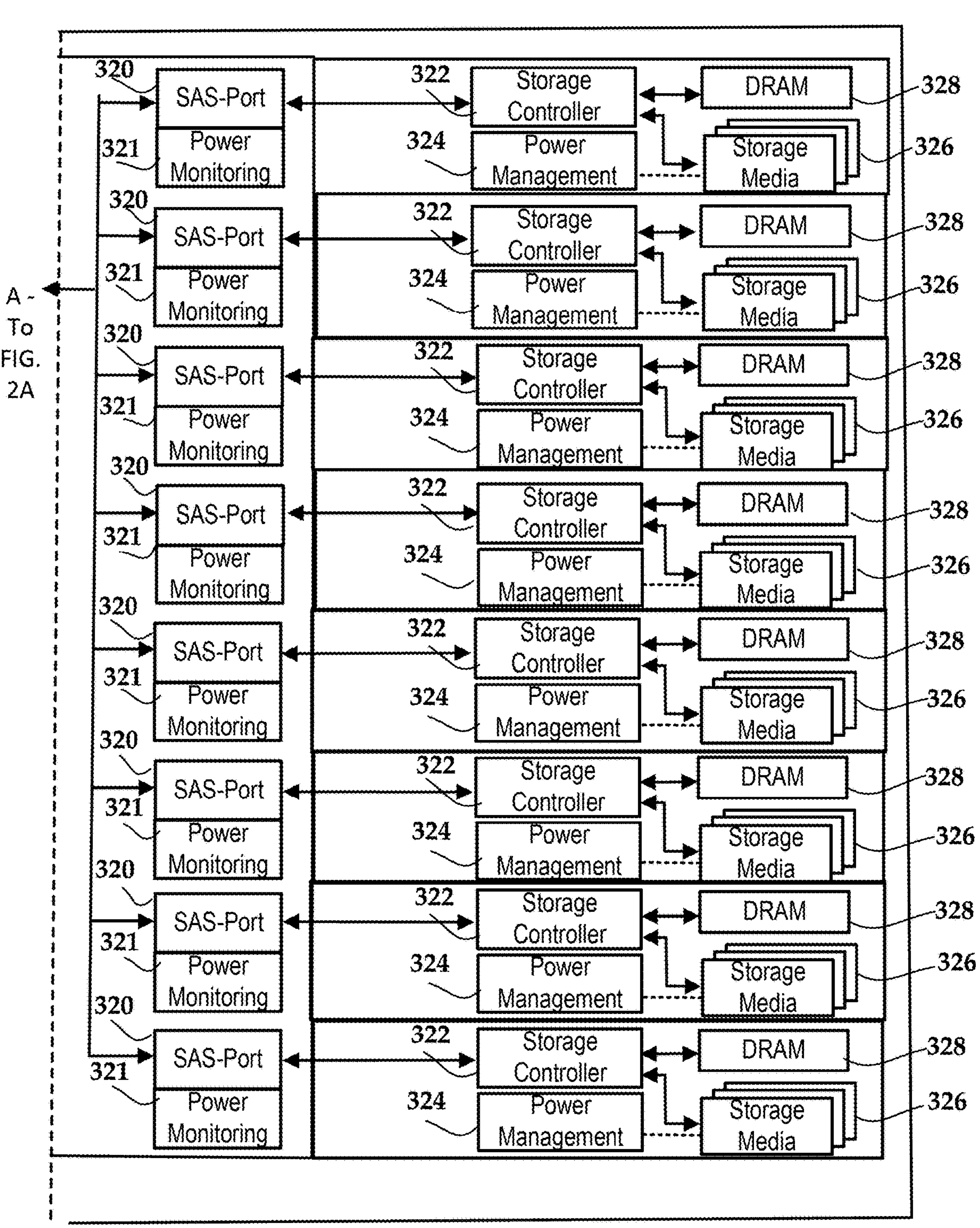

FIGS. 2A and 2B illustrates a schematic diagram that shows a storage system to create a composable, scalable, movable, low-power, fan-less, conduction cooled computational-storage device for edge and data-center use cases. The example shown in FIGS. 2A and 2B uses a single chip having multiple host interfaces. Using a single chip allows for a composable and scalable solution according to various examples. The single chip design also limits the power consumption and total cost of the system. Either FPGA or ASIC is used to manage the entire data-path. This helps in better control of data-path optimization which enables inline or near-data compute. In order to provide composability, NVMe is used as a backbone with both PCIe and Ethernet as host interfaces. PCIe interface provides NVMe-PCIe host interface while Ethernet interface provides NVMe-over-TCP host interface. Both these interfaces may be available simultaneously by intelligently managing common functions without compromising scalability and composability aspects. For PCIe, PCIeG3/G4x4 is used and for Ethernet 10Gx2/40Gx1/100Gx1 is used.

The storage system of FIGS. 2A and 2B allows for compute operations to be performed within the storage RAID controller according to various examples. Compute cores are incorporated within FPGA/ASIC within the RAID controller data path. There can be single or multiple compute cores which can be used. According to various examples, the compute cores will have shared memory in between the storage data path and the compute cores. Data from the storage will be copied from storage devices to this shared memory and then compute operation is performed on this data. Host can get output directly into its main memory or copy this output into storage SSDs to be accessed later. Similarly compute available within each storage can be shared over the same network which allows for reduced compute resources used based on the compute workload.

A storage controller 306 is coupled with a host interface (here shown as a 10G Ethernet port 308 or a PCIe link transport 309 with 8 PCIe lanes and NVMe interface 312) that facilitates communication with a host interface 310, e.g., a compute module. The NVMe interface 312 presents the storage controller 306 to the host 310 as a storage device. Compute namespace and information about individual compute capabilities may happen inline over the NVMe interface 312, for example, by using vendor specific commands.

In some examples, the storage controller 306 can use a different host interface to communicate with the host 310, such as SATA, SAS, or networking interface (e.g., Ethernet, fiber optic networking). In the latter case, the storage controller 306 could also include an embedded processor and memory for running a file system. The filesystem controller structures and organizes data and metadata on the storage array and may be use as a standard filesystem such as new technology file system (NTFS), ext2, ext3, ext4, etc. The storage controller 306 may also provide a network file system protocol over the networking interface, such as network file system (NFS), server message block (SMB), common Internet file system (CIFS), etc.

The storage controller 306 also includes a host accelerator 318, which connects to drives in the array of storage devices as a host device. In this way, the storage controller 306 acts as a proxy for the drives, as well as managing the distribution of data and parity among the drives, calculating parity based on data, rebuilding data based on parity, etc. These latter functions are represented by RAID logic block 314, which is located between the NVMe target core 312 and NVMe host core 318. A security protocol manager 317 includes a watchdog monitor that monitors the system for hangs. The watchdog monitor may also be physically and electrically separate from the storage controller board 306 in some examples. Additionally, the security protocol manager 317 manages data confidentially by providing key management services and an interface for access control of data stored on media. Data confidentiality partitions (or encrypted data ranges) are exposed to the host and mapped by the RAID controller to the backend devices' encrypted data ranges.

Data transfer may be completely managed by the computational storage device. according to various examples. For example, the computational storage device may manage data transfer from NVM memory space 328 to CSF local memory, data transfer from CSF local memory to NVM memory space, data transfer from one CSF local memory to another CSF local memory, and data transfer from CSF local memory to host local memory over NVMe interface.

The host accelerator 318 is coupled to a plurality of SAS ports 320. Each SAS port 320 is associated with a corresponding power monitoring unit 321 that is configured to monitor power to determine if there is a malfunction at the corresponding SAS port 320. Each of the SAS ports 320 connects to a corresponding storage controller 322. The storage controller 322 may include a commercial, off the shelf (COTS) controller that is configured to operate with respective storage media modules 326 and dynamic RAM (DRAM) 328. While the flash storage media modules 326, storage controller 322, and DRAM 328 may be COTS devices, power management modules 324 may be used that are custom designed or selected to be rugged. Additional features of the illustrated system as well as other embodiments are described in greater detail below.

The storage controller 306 includes a memory manager 340 that manages the computational storage system. For example, the memory manager 340 may manage data transfers. Various compute function processing blocks may be computed to the memory manager 340. In FIGS. 2A and 2B, an image analysis data processing unit (DPU) 342 that may be used to analyze images in transferred data. A JPEG CODEC processing unit 344 may be used to encode or decode the transferred data. The memory manager 340 is used to control the computational storage execution engine 370.

The computational storage execution engine 370 includes a dedicated execution controller 374 that manages the computational storage execution functions. DRAM 380 is coupled via a dual data rate (DDR) port with error correction code (ECC) 372. An operating system 371 enables installation and execution of applications on the computational storage device. The operating system 371, enables installation of an application (e.g., an applet or small application) as one or more key-value objects on the data storage drive and enables the execution of the applet within a controlled environment of the computational storage device using one or more computational storage functions (CSFs) 373. The storage device of FIGS. 2A and 2B may include the ability to use a secure digital (SD) card and/or an embedded MultiMediaCard (eMMC) 382 via an eMMC controller 378, for example.

The memory manager 340 may be coupled to a PCIe root port controller 351 that manages an artificial intelligence (AI) accelerator 359. For example, the AI accelerator may be a 22 tera operations per second (22 TOPS) device. A DRAM controller 354 may be used to manage a DRAM 353 for the memory manager 340.

Platform controller 350 provides an interface with the host interface connector 310 and storage controller 306. The platform controller 350 is coupled to the storage controller 306 via universal asynchronous receiver-transmitter (UART) connector 363 and/or a USB 3.0 connector 339. Flash memory 352 is coupled to platform controller 350 and also the computational storage controller 306 via Quad PSI flash bus 365. An integrated and isolated security domain 360 provides Root-of-Trust capabilities and support security services for the storage solution. These services include platform boot code integrity, secure code update and recovery using A/B copies, a cryptographic device identity, attestation of platform identity and firmware, and limited cryptographic services. At least some of these services are implemented using firmware 357 of the platform controller 350. A power connector 332 provides an interface to supply power to the storage controller 306.

Some functionality of the storage controller 306 (e.g., initialization, scheduling, caching, error handling, security) is managed by firmware which runs in microprocessors 362. Baseboard management controllers (BMC) 364 provide internal control path management and monitoring of individual blocks. The BMC 364 may communicate health and/or configurations states to the host. Firmware for the BMCs runs from tightly controlled memory (TCM) 366.

Note that while the components in FIGS. 2A and 2B specifically call out SSDs that utilize NAND flash for data storage, it will be understood that other media, including magnetic disks, may be substituted for NAND flash, in which case the SSDs may be more generally referred to as a drive or storage drive. The power management modules 324 may be considered part of the storage drives or separate from the storage drives depending on the implementation.

By utilizing multiple SSDs in parallel, with RAID redundancy (or other type of failure resistant data redundancy arrangement) and putting them behind a RAID controller 306, the storage system is no longer dependent upon the failure rate of a single device.

Figure 4:
FIG. 4 illustrates multiple enclosures of FIG. 4 that are combined to create a single enclosure according to various examples.
Figure 4:
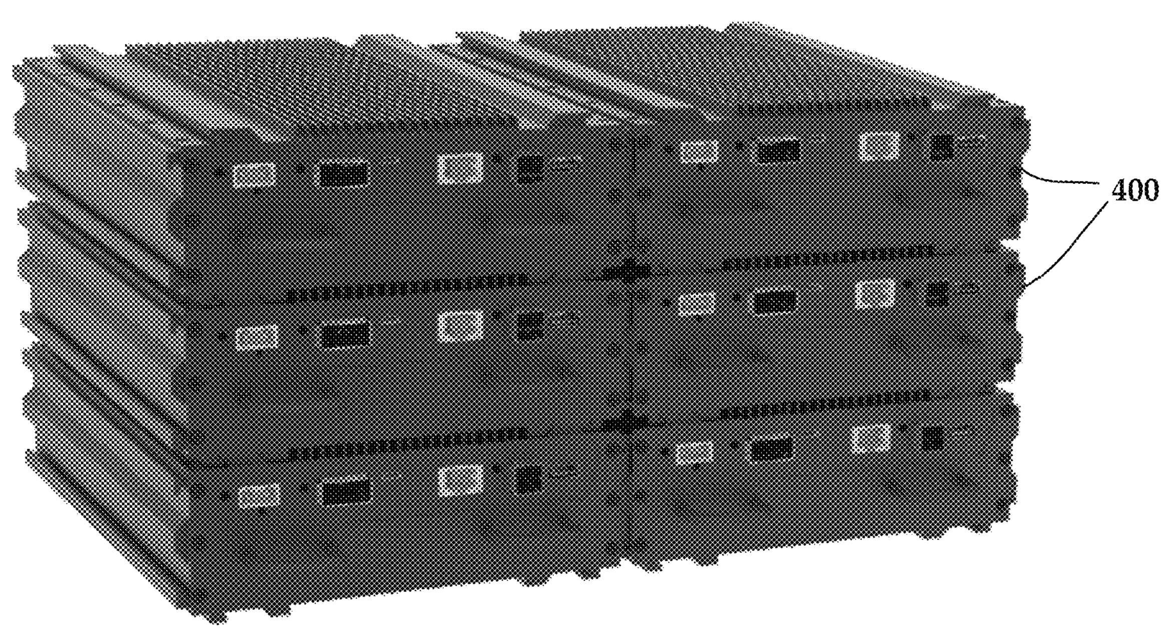

The redundancy level of the RAID controller can be adjusted for the application. For most general-purpose applications, a RAID-5 controller can be used with three data stripes and one parity stripe as shown in FIG. 4. In this diagram, a hardened RAID controller is coupled to a non-hardened (e.g., COTS) drive array, which uses four SSDs for example. For a higher-reliability design, different RAID and/or erasure codes can be used allowing for multiple back-end failures before loss of storage functionality. For example, a RAID-6 arrangement with two data stripes and two parity stripes can be used for a four drive array, and additional data stripes can be added if more drives are added to the RAID 6 array.

Figure 3:
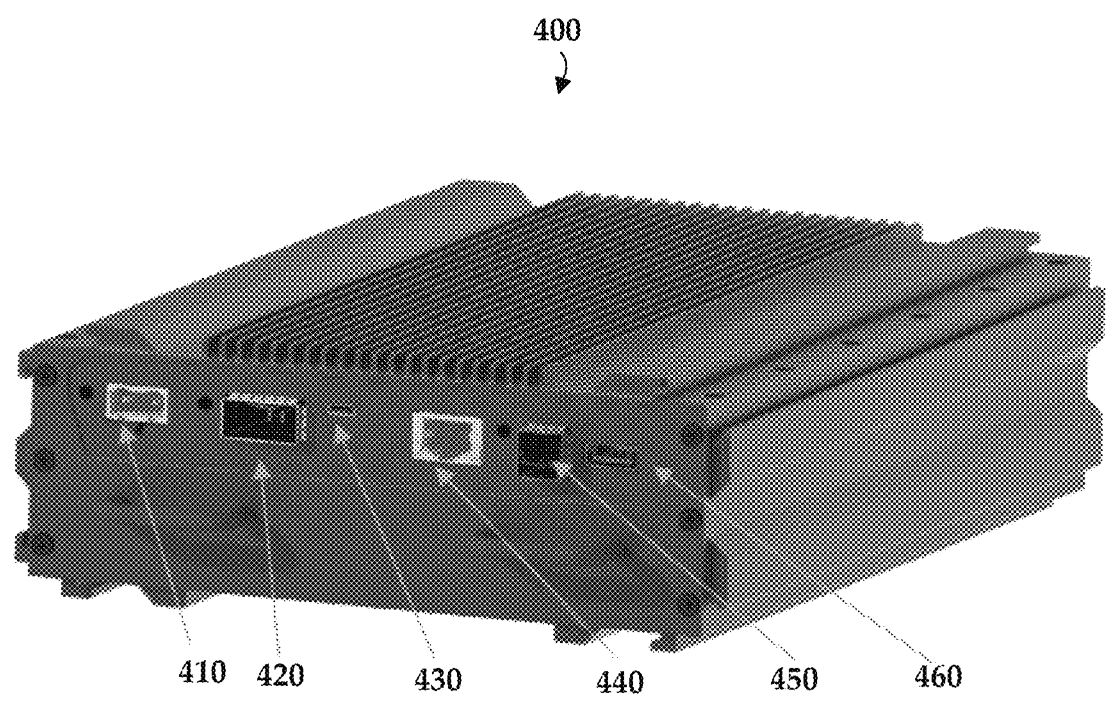
FIG. 3 is shows an enclosure for the rugged storage device according to example embodiments.

Examples described herein involve a system that is both physically composable and has storage compute composability. Physical composability may be achieved by adopting an enclosure design that is modular such that multiple enclosures can be attached together to form one single enclosure. FIG. 3 illustrates a single enclosure for the system described herein and FIG. 4 illustrates multiple enclosures 400 shown in FIG. 4 attached together to form a single enclosure 500. FIG. 3 illustrates various ports that may be included in the system. It is to be understood, that the system may support more of fewer ports and/or different types of ports. In this example, power port 410, an ethernet port 420 (e.g., a 10/40G ethernet port), a UART port 430, a gigabit ethernet port 440 (e.g., 1 Gig E), a PCI express port 450, and a USB3 port 460 are disposed on the enclosure 400.

Long-term HDD performance is susceptible to mechanical noise like vibration or acoustic noise it is exposed to. In typically HDD based storage enclosures, fans are widely used as a cooling mechanism. These fans are typically generate mechanical vibration as well as acoustic noise which can contribute into performance degradation of HDDs in long run. Examples described herein, the enclosure, uses a fan-less enclosure conduction cooling technique without any inbuilt moving parts. The conduction-based cooling technique conducts heat away from all internal components to an external enclosure surface.

Typically edge infrastructures are resource constraints. These constraints are largely due to network connectivity to cloud or data-center infrastructure. Because of such constraints, data may be moved physically to the cloud or data center. Examples described herein adopts elastic storage capability over NVMe-over-TCP interface. This allows easy migration of data-flow from one storage enclosure to another within same network. This helps in easy, reliable, and secure removal of a storage volume from the edge network. Examples described herein may involve moving the storage system to the cloud or to a datacenter infrastructure, on board standard interfaces like PCIe and 10G/40G/100G Ethernet allows you to easy data migration without using any extra adaptors.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 3, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A single chip data storage device, comprising:

an array of storage drives each comprising a respective drive controller, a respective non-volatile storage medium, and a respective volatile memory;

a storage controller coupled to the array, the storage controller providing host access to the array, the storage controller comprising a computational storage execution engine comprising a dedicated execution controller configured to manage computational storage execution functions, and an operating system configured to install one or more applications as one or more key-value objects on the single chip data storage device and to execute the one or more applications based on a computational storage function received from a host; and one or more compute cores incorporated within a controller data path, the one or more compute cores having shared memory between the controller data path and the one or more compute cores, the one or more compute cores configured to locally perform at least one operation on data stored on one or both of the non-volatile storage medium and the volatile memory based on the one or more applications.

2. The single chip data storage device of claim 1, further comprising a cooling system configured to provide cooling to the single chip data storage device, the cooling system comprising a fan-less conduction based cooler.

3. The single chip data storage device of claim 1, further comprising a plurality of host interfaces.

4. The single chip data storage device of claim 1, wherein the storage controller is a redundant array of independent disk (RAID) storage controller.

5. The single chip data storage device of claim 1, wherein the storage controller is implemented in a field programmable gate array (FPGA).

6. The single chip data storage device of claim 1, wherein each storage drive of the array of storage drives further comprises one or more respective power controllers coupled to the respective drive controller and the respective non-volatile storage medium.

7. The single chip data storage device of claim 1, wherein each respective non-volatile storage medium comprises a solid-state storage medium.

8. The single chip data storage device of claim 7, wherein the solid-state storage medium comprises NAND flash memory.

9. The single chip data storage device of claim 1, wherein the one or more compute cores are disposed in the storage controller coupled to the array.

10. The single chip data storage device of claim 1, wherein the storage controller comprises an integrated and isolated security domain that provides root-of-trust capabilities and supports security services for the single chip data storage device.

11. The single chip data storage device of claim 1, further comprising one or more current monitors on each of the storage drives, the one or more current monitors detecting a latch up condition affecting one or both of the drive controllers and the non-volatile storage medium.

12. A data storage system, comprising:

a housing; and a single chip computational data storage device disposed in the housing, the single chip computational data storage device comprising:

a storage controller comprising a computational storage execution engine configured to manage computational storage execution functions, and an operating system configured to install one or more applications as one or more key-value objects on the single chip computational data storage device and to execute the one or more applications based on a computational storage function received from a host; and an array of storage drives, each of the storage drives comprising:

a drive controller;

a NAND flash medium coupled to the drive controller; and a volatile memory coupled to the storage controller;

wherein one or both of the storage controller and the array of storage drives comprises one or more compute cores incorporated within a controller data path, the one or more compute cores having shared memory between the controller data path and the one or more compute cores, the one or more compute cores configured to locally perform at least one operation on data stored on one or both of the array of storage drives and the volatile memory based on the one or more applications.

13. The data storage system of claim 12, further comprising a cooling system configured to provide cooling to the data storage system, the cooling system comprising a fan-less conduction based cooler.

14. The data storage system of claim 12, further comprising a plurality of host interfaces.

15. The data storage system of claim 14, wherein at least one host interface of the plurality of host interfaces is an NVMe-over-TCP host interface.

16. The data storage system of claim 12, wherein the storage controller is a redundant array of independent disk (RAID) storage controller.

17. The data storage system of claim 12, wherein the storage controller is implemented in a field programmable gate array (FPGA).

18. A data storage system, comprising:

a plurality of housings; and a plurality of single chip computational data storage devices, each single chip computational data storage device of the plurality of single chip computational data storage devices disposed in a respective housing of the plurality of housings, each single chip data storage device comprising:

a storage controller comprising a computational storage execution engine configured to manage computational storage execution functions, and an operating system configured to install one or more applications as one or more key-value objects on the single chip computational data storage device and to execute the one or more applications based on a computational storage function received from a host; and an array of storage drives, each of the storage drives comprising:

a drive controller;

a NAND flash medium coupled to the drive controller; and a volatile memory coupled to the storage controller;

wherein one or both of the storage controller and the array of storage drives comprises one or more compute cores incorporated within a controller data path, the one or more compute cores having shared memory between the controller data path and the one or more compute cores, the one or more compute cores configured to locally perform at least one operation on data stored on one or both of the array of storage drives and the volatile memory based on the one or more applications.

19. The data storage system of claim 18, wherein the plurality of housings are configured to couple together to create a single housing.

20. The data storage system of claim 12, wherein the storage controller comprises an integrated and isolated security domain that provides root-of-trust capabilities and supports security services for the data storage system.

* * * * *